(No Model.)

A. M. MANGIN.
PASTRY FORK.

No. 470,005. Patented Mar. 1, 1892.

WITNESSES—
Geo. E. Frech.
Roland H. Fitzgerald

INVENTOR.
Anna M. Mangin
per Lehmann & Pattison
attys.

THE NORRIS PETERS CO., PHOTO-LITHO., WASHINGTON, D. C.

UNITED STATES PATENT OFFICE.

ANNA M. MANGIN, OF WOODSIDE, NEW YORK.

PASTRY-FORK.

SPECIFICATION forming part of Letters Patent No. 470,005, dated March 1, 1892.

Application filed July 7, 1891. Serial No. 398,705. (No model.)

*To all whom it may concern:*

Be it known that I, ANNA M. MANGIN, of Woodside, in the county of Queens and State of New York, have invented certain new and useful Improvements in Pastry-Forks; and I do hereby declare the following to be a full, clear, and exact description of the invention, such as will enable others skilled in the art to which it pertains to make and use it, reference being had to the accompanying drawings, which form part of this specification.

My invention relates to an improvement in pastry-forks.

The object of my invention is to provide a fork or implement for working together butter or lard and flour without the operator having to touch these articles with the hands, and for making drawn butter and thickening, beating eggs, mashing potatoes, and preparing dressing for salads.

Figure 1:
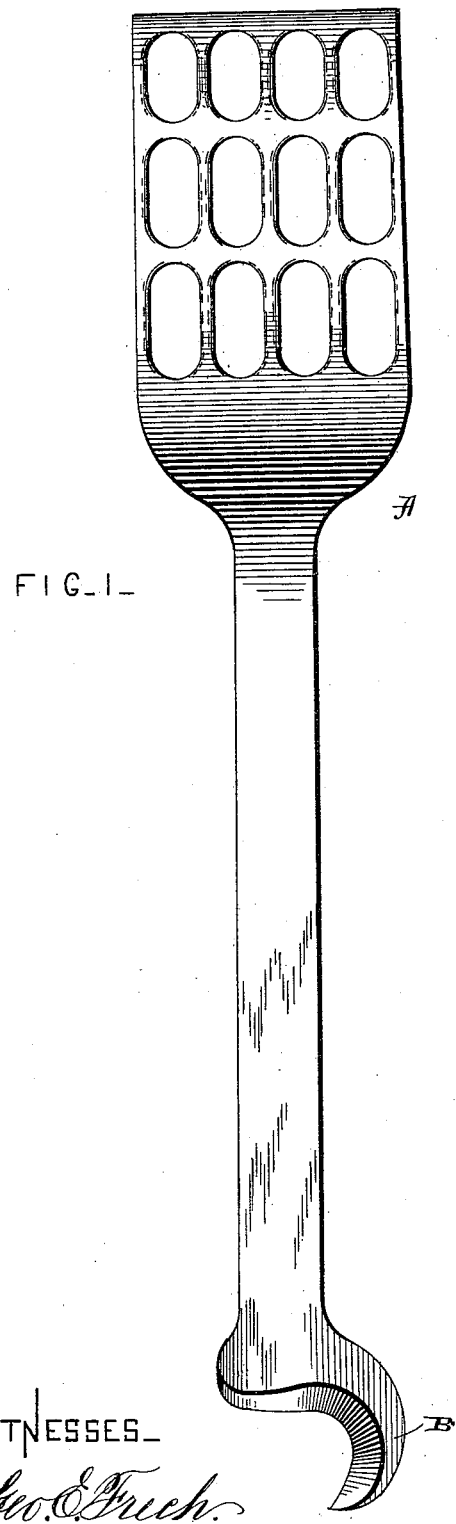
Figure 2:
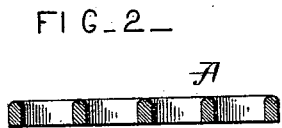
Figure 3:
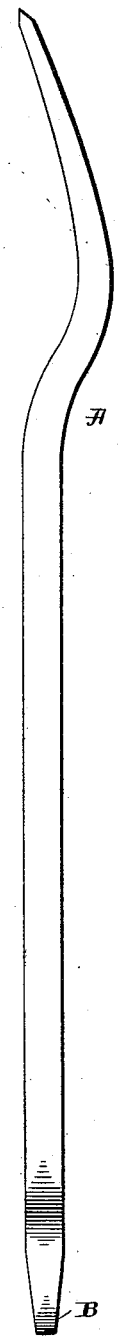

Figure 1 is a plan view of a fork which embodies my invention. Fig. 2 is a cross-section taken through the tines. Fig. 3 is an edge view of my improved article.

A represents the fork, which is to be made of iron, steel, wood, or other suitable material, and which is provided with any desired number of tines, which have their lower edges made angular and sharp for the purpose of cutting the material being operated upon by pressure. These tines are made rounding at their upper edges, so as to allow the material being worked to pass freely through without catching unnecessarily upon the tines. The tines are united by a suitable number of cross pieces or bars, which are preferably formed integrally with the tines, and the lower cross-bar is sharpened at its lower edge for the purpose of making a cutting implement for chopping and other such purposes.

The fork will be made of such a width as to especially adapt it for mixing different articles without the necessity of the operator having to use his or her hands, and is also useful for beating eggs and other such household purposes.

Formed upon the outer end of the handle is a pastry-cutter B, either of the shape here shown or any other that may be preferred. This cutter may or may not be used with the fork, but it will be found a great convenience to combine the two implements in one. This pastry-cutter is curved so as to more easily fit in the bottom of the dish and thoroughly cut and pulverize the dry pastry. The particular object of this tool is to cut and pulverize the dry pastry before water is added thereto and without the hands thereinto. Hence the peculiar construction of a plurality of small rectangular apertures having angular edges, so that when the fork is passed down on the dry pastry it forces the same through the said apertures, accomplishing the desired result.

I am aware that batter-mixers consisting of several long parallel separated (except at the ends) straight tines are old; but I do not claim such devices, as they could not possibly be used for my purpose for cutting and pulverizing, as described.

Having thus described my invention, I claim—

The herein-described pastry-fork for pressing and cutting and pulverizing dry pastry, consisting of the handle and the flat enlarged portion curved up at the ends and having the straight sharp end edge and the plurality of small transverse apertures having sharp angular cutting-edges on the under side, as shown and described.

In testimony whereof I affix my signature in presence of two witnesses.

ANNA M. MANGIN.

Witnesses:
L. O. BLOMQUIST,
A. F. MANGIN.